United States Patent [19]

Yamaura

[11] 4,422,516

[45] Dec. 27, 1983

[54] AXLE HOUSING LEAK OIL DISCHARGING DEVICE

[75] Inventor: Tadao Yamaura, Tokyo, Japan

[73] Assignee: Nissan Motor Co., Ltd., Yokohama, Japan

[21] Appl. No.: 218,332

[22] Filed: Dec. 19, 1980

[30] Foreign Application Priority Data

Dec. 20, 1979 [JP] Japan ................................ 54-166214

[51] Int. Cl.³ .............................................. B60B 35/12
[52] U.S. Cl. ..................................... 180/70 R; 180/88;
188/2 R; 188/218 A; 277/68
[58] Field of Search ............ 180/70 R, 88, 85; 308/187.1; 188/218 A, 2 R; 277/67, 68, 69

[56] References Cited

U.S. PATENT DOCUMENTS

| 1,674,256 | 6/1928 | Nelson ............................... 308/187.1 |
| 1,835,231 | 12/1931 | Loock ..................................... 308/113 |
| 3,690,399 | 9/1972 | Bokovoy ........................... 180/88 X |
| 3,809,177 | 5/1974 | Pirochta, Jr. .......................... 180/88 |

FOREIGN PATENT DOCUMENTS

| 1425020 | 12/1965 | France . |
| 328995 | 5/1930 | United Kingdom . |
| 356062 | 9/1931 | United Kingdom . |
| 373960 | 6/1932 | United Kingdom . |
| 588792 | 6/1947 | United Kingdom . |
| 662150 | 12/1951 | United Kingdom . |
| 698284 | 10/1953 | United Kingdom . |
| 732741 | 6/1955 | United Kingdom . |
| 955438 | 4/1964 | United Kingdom . |
| 1355889 | 6/1974 | United Kingdom . |

OTHER PUBLICATIONS

FIG. 35 on p. 432 of the "Automobiltechnisches Handbuch", Second vol., Written by Bussien, 18th Ed. 1965 (Motor Vehicle Manual).

*Primary Examiner*—John A. Pekar
*Attorney, Agent, or Firm*—Thompson, Birch, Gauthier & Samuels

[57] ABSTRACT

A device for use with a wheel axle shaft and housing for preventing oil that leaks from within the axle housing from escaping along the axle shaft to a brake device, comprises an oil passage along the axle shaft to discharge the leaked oil from the axle shaft, and an annular member securely mounted on the axle shaft and in the oil passage to splash the leaked oil guided thereon radially and outwardly by applying a centrifugal force to the oil, thereby effectively discharging the leaked oil from the axle shaft in order to prevent the leaked oil from travelling along the axle shaft to reach the brake device.

5 Claims, 4 Drawing Figures

AXLE HOUSING LEAK OIL DISCHARGING DEVICE

BACKGROUND OF THE INVENTION

1. Field of the Invention

This invention relates to an improvement in a wheel axle and housing assembly of a vehicle, and more particularly to a device for compulsorily discharging oil leaked from within the axle housing out of the vehicle.

2. Description of the Prior Art

In connection with a wheel axle and housing assembly of a vehicle, although the assembly is equipped with an oil seal, oil within the axle housing unavoidably leaks out little by little. Conventionally, however such assemblies are generally not equipped with a device for compulsorily discharging the leaked oil out of the vehicle. Accordingly, if the leaked oil accumulates in the vicinity of a wheel bearing or the amount of the leaked oil increases, the oil is guided along the axle towards an end section thereof. This can become a problem in the event that the guided oil enters a braking device positioned at the end section of the axle shaft, in which the entered oil becomes attached to the functional surface of a brake drum or to the surface of a brake disc, thus rendering the brake ineffective.

BRIEF SUMMARY OF THE INVENTION

According to the present invention, a wheel axle and housing assembly of a vehicle is provided with a device for preventing oil that leaks from within the axle housing from escaping along an axle shaft to a brake device. The device comprises an oil passage along the axle shaft to discharge the leaked oil out of the axle housing, and an annular member securely mounted on the axle shaft and in the oil passage to splash the leaked oil guided thereon radially and outwardly by applying a centrifugal force onto the leaked oil guided thereon. Specifically, the annular member is a spacer interposed between the bearing and a large diameter section of the axle shaft, which spacer is formed with one or two annular flanges extending radially therefrom in a manner to block the flow of oil that seeps through the wheel bearing and prevent the oil from traveling further radially therepast. With the thus arranged device, the oil leaked from within the axle housing can be effectively discharged out of the vehicle, preventing the leaked oil from traveling along the axle shaft to the brake device including a brake drum or a brake disc.

BRIEF DESCRIPTION OF THE DRAWINGS

The features and advantages of the device according to the present invention will be more clearly appreciated from the following description take in conjunction with the accompanying drawings in which like reference numerals designate the corresponding parts and elements, and in which.

DETAILED DESCRIPTION OF THE INVENTION

Figure 1:
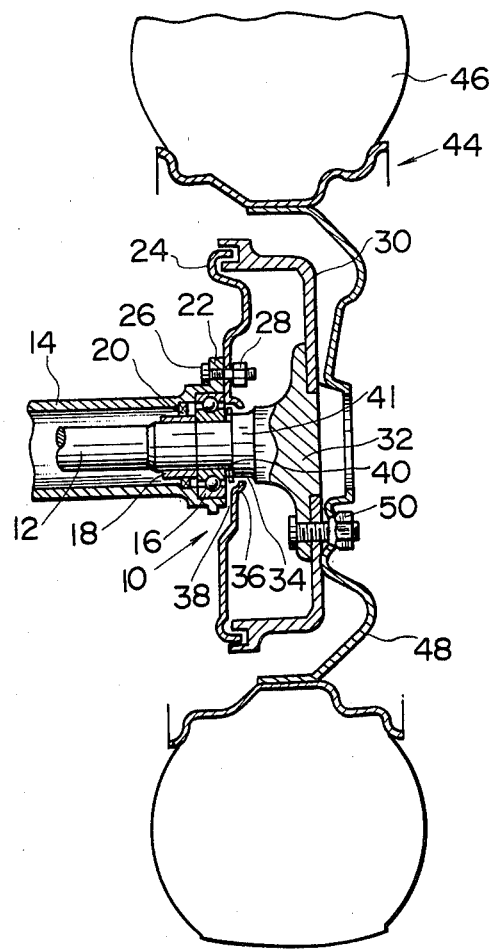
FIG. 1 is a cross-sectional view of a wheel axle and housing assembly to which the principle of the present invention is applied.
Figure 2:
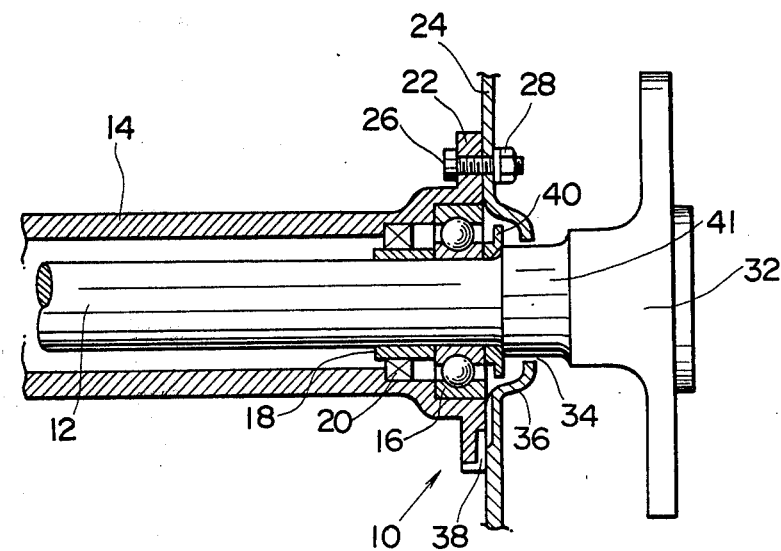
FIG. 2 is an enlarged sectional view of FIG. 1, showing an essential part according to the present invention.
Figure 3:
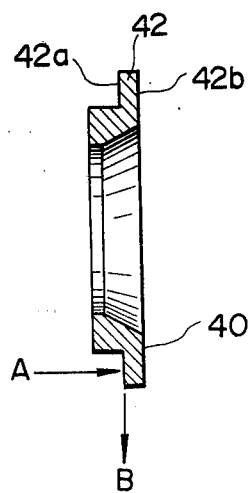
FIG. 3 is an enlarged sectional view of an example of a spacer used in the device of FIG. 2.

Referring now to FIGS. 1, 2, and 3 of the drawings, there is shown a wheel axle and housing assembly of a vehicle, equipped with a device 10 for compulsorily discharging oil that leaks from within an axle housing 14 out of the vehicle, in accordance with the present invention. The wheel axle and housing assembly comprises a wheel axle shaft 12 which is rotatably disposed within axle housing 14, and rotatably supported through a wheel bearing 16 on the inner surface of the axle housing 14. A cylindrical collar 18 is securely disposed on the axle shaft 12. An annular oil seal 20 is interposed between the outer surface of the collar 18 and the inner surface of the axle housing 14 to prevent oil from a final drive unit or final reduction gear unit (not shown) from leaking out of the axle housing 14.

The axle housing 14 is formed at one end with a flange section 22 to which a brake backing plate 24 is secured by using bolts 26 and nuts 28. The backing plate 24 forms part of a braking device for braking a brake drum 30 which is secured to the wheel installing section 32 of the axle shaft 12. The backing plate 24 is formed with a central section having a central opening 34 through which the axle shaft 12 passes. As shown, the backing plate central section is bulged outwardly to form a bulged section 36. Additionally, an oil discharge passage 38 is formed between the brake backing plate 24 and the flange section 22 of the axle housing 14, which oil discharge passage is positioned under the axle shaft 12 and formed in the vertical from the relative to the vehicle, in order to communicate the inside of the above-mentioned bulged section 36 with the outside of the vehicle.

An annular spacer 40 is securely mounted on the axle shaft 12 and interposed between the large diameter section 41 of the axle shaft 12 and the bearing 16. As best seen from FIG. 3, the spacer 40 is formed with an annular flange 42 which extends radially and outwardly, which flange has opposite and parallel flat annular side surfaces 42a and 42b. The annular surfaces 42a and 42b are so arranged that the axis of the axle shaft 12 is generally perpendicular thereto. As usual, the wheel 14 having a tire 46 is secured to the wheel installing section 32 of the axle shaft by a wheel disc 48 by using wheel nuts 50.

With the thus arranged wheel axle assembly, when the oil within the axle housing 14 leaks through the oil seal 20 and seeps through the bearing 16, the seeped oil travels via the bearing 16 and reaches the rotating spacer 40. The oil reaching the spacer 40 moves on the flange side surface 42a and travels toward the outer periphery of the flange 42 by virtue of the centrifiugal force applied to the oil on the spacer 40. As shown in FIG. 3, the adhering force of the oil acts on the flange side surface 42a in the direction of an arrow A, while the above-mentioned centrifugal force due to the rotation of the spacer 40 acts in the direction of an arrow B. Therefore, the above-mentioned oil adhering force acting on the flange side surface 42a does not disturb the oil movement toward the periphery of the spacer flange 40 due to the centrifugal force generated by the rotation of spacer 40. Hence, the oil effectively travels on the flange side surface 42a in the direction away from the axle shaft 12.

When the oil reaches the flange periphery or the corner formed by the flange side surface 42a and the peripheral surface of the spacer flange 42, the oil separates from the flange corner to be splashed by the centrifugal force due to the rotation of the spacer 40. Since the spacer 40 is so formed that its outer diameter is larger to increase the peripheral speed thereof, the centrifugal force at the outer peripheral section of the spacer flange 42 becomes larger. This results in an excellent oil splashing effect of the spacer. Otherwise, even if there is oil which remains on the outer peripheral surface of the spacer flange 42 without separating therefrom to be moved to the opposite side surface 42b, the oil is separated and radially splashed by virtue of a larger centrifugal force due to the rotating flange side surface 42b and therefore the oil never travels on the side surface 42b toward the axle shaft. Hence, the very small amount of oil leaked from within the axle housing that travels over the spacer is splashed by the centrifugal force on the spacer side surface 42b away from the axle shaft toward the backing plate bulged section 36, so that there is no fear of the leaked oil entering the inside of the brake drum 30 via the backing plate central opening 34.

The thus splashed oil from the spacer flange section 42 is attached onto the inner surface of the bulged section 36 of the backing plate 24 and travels downwardly to be discharged through the oil discharge passage 38 out of the vehicle.

It will be understood that if the spacer 40 is not formed with the flange section 40, the oil leaked via the oil seal 20 and the bearing 16 can travel on the surface of the axle shaft 12 over the spacer and will enter the inside of the brake drum 30 through the backing plate opening 34, and otherwise may be attached onto the surface of a brake disc in the case of using a disc brake though not shown.

Figure 4:
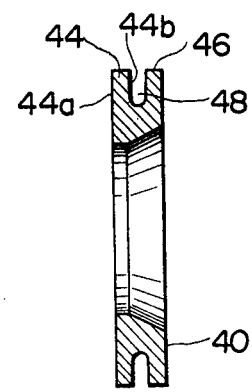
FIG. 4 is an enlarged sectional view of another example of the spacer unuable in place of the spacer of FIG. 3.

FIG. 4 shows another example of the spacer 40 which is formed with front and rear parallel flanges 44 and 46 which extend radially and outwardly and are arranged that the axis of the axle shaft 12 is generally perpendicular to the surfaces thereof. As shown, a channel or groove 48 is formed between the two flanges 44 and 46.

With this arrangement, the oil leaked from within the axle housing 14 through the oil seal 20 and the bearing 16 rarely reaches the back surface 44b of the front flange 44 like with the spacer 40 shown in FIG. 3. However, even in the rare case wherein the oil travels from the peripheral surface of the flange 44 to the adjacent peripheral surface of the flange 46 over the groove 48 for any unexpected reason, only the centrifugal force is applied to the oil bridging over the groove 46 without the adhering force of oil to the surface of the groove, due to the fact that a space is formed between the bridging oil and the bottom surface of the groove 48. Therefore, all the oil guided onto the surface of the spacer 40 can be surely splashed radially and outwardly without the oil remaining adhered on the surface of the spacer. It will be understood that the shapes and relative dimensions of the two flanges 44 and 46 are not limited to those in the example of FIG. 4 and therefore other shapes and relative dimensions are also applicable.

While the principle of the present invention has been shown and described as being applied only to the drum type brake, it will be appreciated that the present invention principle is applicable to other types of brakes such as disc brakes.

As is discussed above, according to the present invention, the spacer disposed on the axle shaft is formed with a flange or two flanges with a groove therebetween, in order to splash the oil radially and outwardly by virtue of the centrifugal force due to the rotation of the spacer flange, thereby compulsorily removing the oil from the surface of the spacer. As a result, the oil can be prevented from travelling to the inside of the brake drum, the brake disc etc. because of the fact that the leaked oil is stored on and in the vicinity of the spacer. Besides, according to the present invention, in the case of a wheel axle assembly which is equipped with a spacer for a bearing, the present invention is easily applicable only by replacing the spacer without increasing the number of component parts of the wheel axle assembly, which scarecely contributes to increase in cost of the vehicle.

Moreover, according to the present invention, since the diameter of the spacer is increased, the spacer exhibits an advantageous effect to prevent rain water from entering the inside of the spacer or the bearing, which rain water is guided from the direction of the axle shaft end section or of the brake device. In this connection, the rain water attached onto the surface of the spacer is splashed radially and outwardly together with the oil to be compulsorily discharged outside the vehicle, thereby providing a water preventing effect to the bearing positioned inside of the spacer.

What is claimed is:

1. A device in combination with a wheel axle shaft and housing, comprising:
   a wheel bearing positioned between the housing and the axle shaft;
   an annular spacer mounted on the axle shaft at a location interposed between and in contact with said bearing and an enlarged diameter section of the axle shaft, said enlarged diameter section extending into a brake drum of a frictional braking device for frictionally braking a wheel;
   a plate member secured to a flange section of the axle housing and having a central opening through which the enlarged diameter section of the axle shaft passes to enter the brake drum, said plate member forming part of said braking device;
   a first annular flange formed as an integral part of said annular spacer and extending radially therefrom in a manner to collect oil that seeps through the wheel bearing and to splash the collected oil radially outwardly therefrom by the centrifugal force generated by the rotation of the axle shaft; and
   means radially spaced from and surrounding said annular flange to collect the splashed oil and to guide the same to the exterior of said housing.

2. A device as claimed in claim 1, wherein said first annular flange has an annular flat surface perpendicular to the axis of the axle shaft and on which the leaked oil is guidable.

3. A device as claimed in claim 2, further comprising a second annular flange parallel to said first annular flange to define an annular groove therebetween.

4. A device as claimed in claim 1, further comprising a second annular flange formed with said annular spacer and extending radially therefrom, said second annular flange being parallel to said first annular flange to define an annular groove therebetween.

5. A device as claimed in claim 1, further comprising an annular oil seal positioned between the axle housing and the axle shaft and upstream of the bearing relative to the oil flow along the shaft.

* * * * *